Feb. 4, 1930.  A. H. TASHJIAN  1,746,201
METALLIC STRUCTURAL ELEMENT
Filed April 23, 1926  2 Sheets-Sheet 1
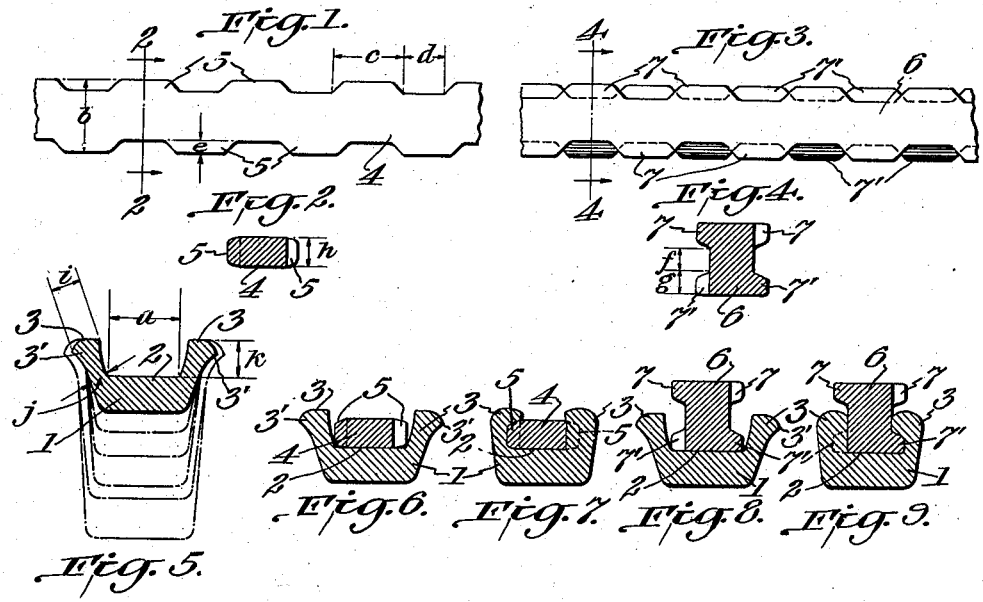
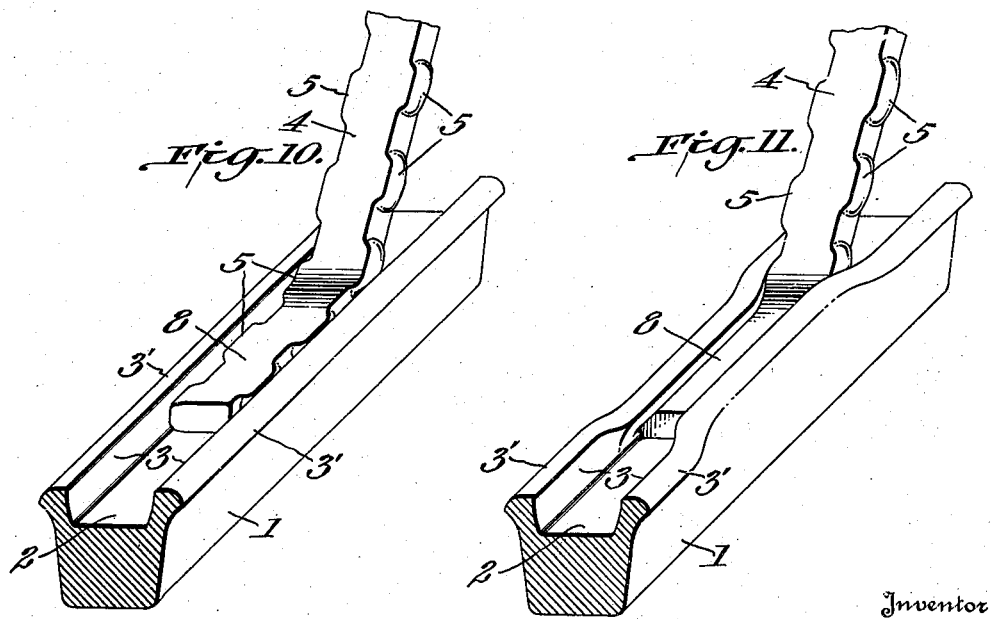
Inventor
Armen H. Tashjian
by
Attorney

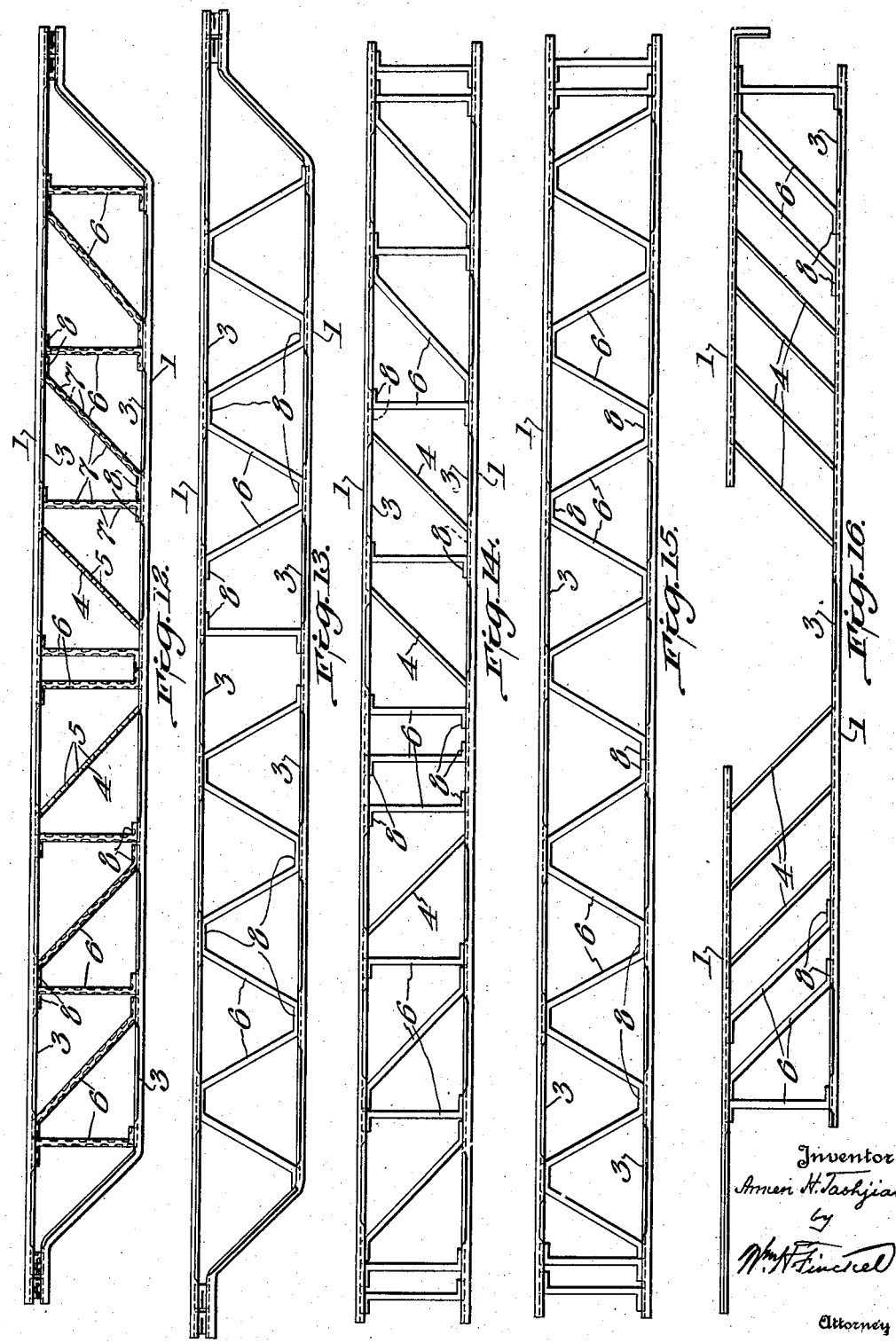

Patented Feb. 4, 1930

1,746,201

UNITED STATES PATENT OFFICE

ARMEN H. TASHJIAN, OF CLEVELAND, OHIO

METALLIC STRUCTURAL ELEMENT

Application filed April 23, 1926. Serial No. 104,034.

This invention relates to structural elements such as metal joists, metal trusses, metal units for reinforcing concrete and the like, and the object of the invention is to provide simple means for the assembling of the members comprising such structural elements preferably from rolled metal bars in such a manner as to develop therein safe joint strength values without recourse to riveting, welding or the use of any attaching means other than those forming a part of the members comprising the elements.

This invention is in the nature of an improvement on the invention covered by my Patent No. 1,013,698, dated January 2, 1912, and embodies changes over the invention covered by said patent whereby the rolling or manufacture of the members and their assembling for forming the elements are considerably simplified and the cost of production thereby measurably lessened.

As is well known, structural elements, such as joists, trusses, concrete reinforcing units and the like are composed essentially of two types of members, chord members and web members, and the connecting of these members at the junctions between them must produce joints of such rigidity as to transmit all stresses from one to the other without slippage or other movement between the members at the joints.

Such connections are usually made by means of riveting or welding the joints, but it is common knowledge that every row of riveting and every rivet in any structural element reduces the effective cross-sectional area of the members joined and forming such element; and it is also true that the efficiency of welded joints is uncertain, at best.

Obviously, therefore, there are great advantages in structural elements wherein there is no reduction of the effective area of the members due to riveting or other common methods of connecting the members of such elements, and where welded joints of uncertain strength need not be relied upon, provided, of course, that the members of such a structural element be so fabricated and joined as to produce an element having rigid joints of a strength equal at least to the elastic limit strength of its members.

In the invention of my patent above mentioned, I used, in the construction of my structural elements, two types of specially rolled or fabricated members, namely, chord members or main bars consisting of a body portion having a pair of outwardly extending flanges forming between them a trough or groove, and the flanges having pressed in them at regular intervals a series of cup-like recesses; and web members or secondary bars of substantially the same width as the grooves of the main bars and having upon their opposite faces series of lugs the surfaces of which are curved so as to conform to the cup-shaped recesses in the flanges of the chord members, the lugs, however, being smaller than the recesses.

This construction, although efficient to produce a very rigid and satisfactory joint, necessitated rolling operations for the fabrication of the two types of members which were more or less expensive, in that the relative spacing of the recesses in one type of member and the lugs on the other type of member had to be somewhat exact in order to obtain a proper cooperative fit between the two. Moreover, in assembling structural elements composed of members of this type the positioning of the recesses in the chord members had to be taken into consideration in order to provide for proper relative locating of the web or secondary members with respect thereto and to the structural element itself.

The improvement exemplified by the present invention consists in a structural element comprising members of two different types, such as the chord members and web members of a joist, truss or concrete reinforcing unit, one of these members being provided with offstanding knobs or lugs and the other member being provided with deformable lips or flanges, these flanges forming between them a channel in which a connecting portion of the knobbed member may be positioned with its knobs in cooperative relation to the flanges, and the flanges being adapted to be clinched upon the connecting portion of the knobbed member, this clinching acting to imbed the knobs in the material of the flanges, and causing such material to flow into the spaces between knobs, to thereby form a rigid connection between the members, without the employment of any preformed recesses in the flanges; and the invention consists further, in various features of construction of the members, and in various cooperative properties thereof, as I will proceed now to explain and finally claim.

In the accompanying drawings illustrating the invention, in the several figures of which like parts are similarly designated, Figure 1 is a fragmentary plan view of a web or secondary member provided with single rows of knobs. Fig. 2 is a section taken on the line 2—2 of Fig. 1. Fig. 3 is a fragmentary plan view of a web or secondary member provided with double rows of knobs. Fig. 4 is a section taken on the line 4—4 of Fig. 3. Fig. 5 is a transverse section of a chord member or main bar; the broken lines therein illustrating a number of sizes of such bars and showing their relative cross sectional areas. Figs. 6 and 7 illustrate in cross section a joint between a chord member and the attaching portion of a web member of the single knob type before and after clinching, respectively. Figs. 8 and 9 illustrate a joint between a chord member and the attaching portion of a web member of the double knob type before and after clinching, respectively. Figs. 10 and 11 are fragmentary perspective views illustrating the formation of a joint between a chord member and a web member before and after clinching, respectively. Figs. 12 and 13 are semi-diagrammatic illustrations of two forms of joists for the formation of which my members are adapted. Figs. 14 and 15 are semi-diagrammatic illustrations of two forms of truss members which may be formed of my members. Fig. 16 is a semi-diagrammatic illustration of a concrete reinforcing unit which may be formed of my members.

Figs. 12, 13, 14, 15 and 16 are given as instances merely of a number of types of structural elements, and, although I have indicated the knobs on the web members in Fig. 12 only, it will be understood that the web members in all of the other forms of elements shown are likewise knobbed.

The material 1 of which the chord members of the structural elements are to be made is provided with a trough or groove 2 flanked by flanges 3, and may be provided in a number of sizes of varying cross-sectional area, as indicated in Fig. 5, to meet the requirements of the element to be formed therefrom. This material may be produced in desired lengths and cut and bent, as required, to form various types of chord members or main bars, some of which types are illustrated in Figs. 12 to 16.

Regardless of the cross-sectional area of the material 1, I have found by calculation and experiment and in practice that the flanges 3 should have certain characteristics in order to provide a joint or grip strength equal to practical requirements. These characteristics are as follows:—The flanges should have a width at the base ($j$ Fig. 5) not less than one-half nor more than three-quarters the width of the head ($i$ Fig. 5). The heads of the flanges 3 should be provided upon their outer faces with beads 3' which form the additonal area and which, when the flanges are clinched upon the web members, as hereinafter described, provide additional metal to flow in between the knobs of the web members.

As will be seen, particularly by reference to Fig. 10, the flanges 3 are perfectly plain upon their inner faces, as distinguished from the flanges of the main bars of the invention of my patent hereinbefore mentioned.

I have illustrated two kinds of material which may be used in the formation of the web or secondary members of my elements, but either or both kinds may be employed with the single type of main bar material 1 just described.

The material 4 illustrated in Figs. 1, 2, 6, 7, 10 and 11, and which is used for this purpose, is flat in cross-section, as shown, and each of its edges is provided with a plurality of knobs or projections 5, arranged in staggered relation on opposite edges.

The material 6, Figs. 3, 4, 8 and 9, similarly used, is heavier and of greater strength than the material 4 last described, but is adapted for joining with the chord or main bar material 1 by providing it with two rows of knobs or projections 7, 7' on its upper and lower edges, respectively, either of which may be cooperatively engaged by the flanges 3, and the alternate knobs of which are staggered, as shown in Fig. 3.

The material for the web members and the knobs or projections 5, 7, 7' thereon, whether of the type of material designated by the numeral 4 or by the numeral 6, should possess, as I have found by calculation, experiment and in practice, the following characteristics, in order to provide a joint having the requisite grip strength, namely:—

The width of the web material 4, 6 from the outer face of a knob on one side to the outer face of a knob on the other side ($b$ Fig. 1) should approach, as nearly as is possible in commercial manufacture, the width ($a$ Fig. 5) of the trough 2 of the main bar or chord member material 1.

The knobs or projections 5, 7, 7' should have a length ($c$ Fig. 1) at their bases approximately equal to the average width ($a$ Fig. 5) of the trough 2.

The width of the knobs at their bases ($h$ Fig. 2—$g$ Fig. 4) should not be less than two-thirds nor more than nine-tenths the depth ($k$ Fig. 5) of the trough or groove 2 of the main bar 1.

The knobs are made in the shape of flattened oval cones and should have an extreme projection ($e$ Fig. 1) from the side surfaces of the web material 4, 6 of not less than one-sixth nor more than one-fourth the width ($a$ Fig. 5) of the trough 2 of the main bar 1.

The distance ($d$ Fig. 1) between two successive knobs of a row, and forming the recess between the knobs 5, 7, 7' should be not less than one-half the full length ($c$ Fig. 1) of a knob nor more than its full length.

In the double knobbed material 6, the rows of knobs 7 and 7' are separated a distance ($f$ Fig. 4) which is approximately equal to the base width ($g$ Fig. 4) of the knobs.

As hereinbefore stated, these essential characteristics just set forth have been arrived at by experiments and tests to develop the grip strength of the joints between main members and secondary members to a point where such grip strength equals or exceeds the elastic limit of the secondary members. This strength is an essential factor in the strength of the completed structural element formed of the members, and without it the element would fail in service.

Structural elements formed of members having the characteristics described may be so designed that the web members have attaching portions 8, Figs. 10 to 16, of a length to include at least two knobs on each side to be gripped by the flanges of the main bars or chord members and this will produce a joint between the members of such strength as to equal or exceed the elastic limit of the web members, thus giving the necessary factor of strength in the elements.

In order to insure proper imbedding of the knobs of the web members in the flanges of the chord members and the flowing of the metal of these flanges into the recesses between the knobs, I find it advisable to make the metal of the web members of a hardness greater than that of the chord members. For example, the chord members may be made of substantially structural grade steel and the web members of a slightly harder grade steel.

By thus using steels of two grades of hardness for the two classes of members the lugs or knobs 5, 7, 7' being harder than the flanges 3, will be certain to imbed themselves in the flanges when assembling pressure is applied and will not be deformed, and the metal of the flanges will flow around the knobs and fill the recesses between them, as indicated in Figs. 7 and 9.

In assembling structural elements, such as the joists, trusses and concrete reinforcing units illustrated in Figs. 12 to 16, composed of the hereinbefore described members, I position the web members, whether of material of the type shown in Fig. 1 or of the type shown in Fig. 3, with their attaching portions 8 lying in the grooves 2 of the chord members and contacting with the bottoms of such grooves, (see Fig. 10) and then, by means of a bulldozer or other appropriate pressure applying means, I deform the flanges 3 so that they embrace the knobs, as shown in Figs. 7, 9 and 11, the knobs 5, 7, 7' at the same time, due to their greater degree of hardness, forming their own sockets or imbedding themselves in the flanges 3 and the metal of the flanges flowing around and embracing the knobs and filling the recesses between the knobs. This clinching of the flanges upon the attaching portions 8 of the web members forms a rigid, non-slipping and inseparable connection between the members, and produces a joint strength equal to or exceeding the elastic limit of the web members.

Web members formed of the material shown in Figs. 3 and 4 and having two rows of knobs 7, 7' upon each of its sides may be used where extra strength is required, as they have a greater strength than those formed of the material shown in Figs. 1 and 2, but being designed to cooperate with chord members having a standard groove and flanges for both types, may not only be used in combination with web members formed of the other material but permit the material of the standard chord members to have a relatively greater cross-sectional area than would be possible if larger knobs were used on the heavier web material, necessitating a deeper groove and higher flanges in the material of the chord members.

Various changes are contemplated as within the spirit of the invention and the scope of the following claims.

What I claim is:—

1. In a structural element, two cooperating members arranged to be connected one to the other, one of said members being substantially rectangular in cross-section and having two of its opposite faces provided with two rows of knobs arranged along and adjacent to the edges of said faces, and the other member provided with deformable flanges, the member having knobs arranged to be positioned with one row of its knobs on each face in cooperative relation to said flanges, and said flanges adapted to be clinched upon said member, said flanges having plain knob-engaging surfaces and the clinching operation acting to embed said knobs in said flanges to form a rigid connection between said members.

2. In a structural element, two cooperating members arranged to be connected one to the other, one of said members being substantially rectangular in cross-section and having two of its opposite faces provided with two rows of knobs arranged along and adjacent to the edges of said faces, the knobs of the two rows being spaced from each other and arranged in staggered relation upon the opposite faces, and the other member provided with deformable flanges, the member having knobs arranged to be positioned with one row of its knobs on each face in cooperative relation to said flanges, and said flanges adapted to be clinched upon said member, said flanges having plain knob-engaging surfaces and the clinching operation acting to embed said knobs in said flanges to form a rigid connection between said members.

3. In a structural element, two cooperating members arranged to be connected one to the other, one of said members provided with knobs and the other member provided with a groove and deformable flanges flanking said groove, said flanges being of greater cross-sectional area at their tops than at their bottoms, the two members being connected by clinching the flanges of the one upon the knobs of the other and thereby embedding said knobs in said flanges, and the additional area at the tops of the flanges providing metal to flow in between the knobs during the clinching operation.

4. In a structural element, two cooperating members arranged to be connected one to the other, one of said members provided with knobs and the other provided with a groove and deformable flanges flanking said groove, said flanges being of greater cross-sectional area at their tops than at their bottoms and having beads upon their outer faces, the two members being connected by clinching the flanges of the one upon the knobs of the other and thereby embedding said knobs in said flanges, and the beads at the tops of the flanges providing metal to flow in between the knobs during the clinching operation.

In testimony whereof I have hereunto set my hand this 21st day of April A. D. 1926.

ARMEN H. TASHJIAN.